US012348566B2

(12) United States Patent
Wang

(10) Patent No.: US 12,348,566 B2
(45) Date of Patent: Jul. 1, 2025

(54) MULTI-LINK WIRELESS COMMUNICATIONS CONNECTIONS

(71) Applicant: MAXLINEAR, INC., Carlsbad, CA (US)

(72) Inventor: Huizhao Wang, San Jose, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 18/054,578

(22) Filed: Nov. 11, 2022

(65) Prior Publication Data

US 2023/0074290 A1 Mar. 9, 2023

Related U.S. Application Data

(63) Continuation of application No. 17/027,455, filed on Sep. 21, 2020, now Pat. No. 11,595,442.

(60) Provisional application No. 62/924,934, filed on Oct. 23, 2019.

(51) Int. Cl.
| | |
|---|---|
| H04L 29/06 | (2006.01) |
| H04L 9/40 | (2022.01) |
| H04W 12/0433 | (2021.01) |
| H04W 12/50 | (2021.01) |
| H04W 12/60 | (2021.01) |
| H04W 12/71 | (2021.01) |
| H04W 76/15 | (2018.01) |

(52) U.S. Cl.
CPC ......... *H04L 63/18* (2013.01); *H04W 12/0433* (2021.01); *H04W 12/50* (2021.01); *H04W 12/66* (2021.01); *H04W 12/71* (2021.01); *H04W 76/15* (2018.02)

(58) Field of Classification Search
CPC ....... H04L 63/18; H04L 63/162; H04L 29/06; H04W 76/15; H04W 12/0433; H04W 12/50; H04W 12/71; H04W 12/66; H04W 12/047; H04W 84/12; H04W 12/009
See application file for complete search history.

(56) References Cited

U.S. PATENT DOCUMENTS

| | | | |
|---|---|---|---|
| 7,995,546 B2 | 8/2011 | Walker et al. | |
| 11,595,442 B2 | 2/2023 | Wang | |
| 2006/0045267 A1* | 3/2006 | Moore | H04L 63/20 380/247 |
| 2007/0250713 A1* | 10/2007 | Rahman | H04W 12/50 713/171 |
| 2007/0280481 A1* | 12/2007 | Eastlake | H04W 12/50 380/277 |

(Continued)

OTHER PUBLICATIONS

Huang, et al. Multi-Link Operation Frame, IEEE 802.11-19/0773r7 Jul. 1, 2019 <<https://mentor.IEEE.org/802.11/dcn/19/11-19-0773-07-00be-multi-link-operation-framework.pptx>>.

(Continued)

*Primary Examiner* — Khalid M Almaghayreh
(74) *Attorney, Agent, or Firm* — Buchalter; Jason W. Croft

(57) ABSTRACT

A method includes receiving, from a receiver, a broadcast probe request with a multi-link designator, determining that the receiver is multi-link capable based on the probe request, transmitting a probe response including a first multi-link upper Media Access Control (MAC) entity identity of a transmitter, receiving an authentication trigger from the receiver, and transmitting an authentication response to the receiver.

21 Claims, 12 Drawing Sheets

(56) References Cited

U.S. PATENT DOCUMENTS

| | | | | |
|---|---|---|---|---|
| 2008/0031155 | A1* | 2/2008 | Korus | H04L 63/20 713/168 |
| 2010/0332822 | A1* | 12/2010 | Liu | H04W 12/041 713/151 |
| 2011/0154038 | A1* | 6/2011 | Qi | H04W 12/50 380/34 |
| 2013/0095789 | A1* | 4/2013 | Keevill | H04W 12/068 455/411 |
| 2013/0266136 | A1* | 10/2013 | Chu | H04W 36/0033 380/34 |
| 2014/0359731 | A1* | 12/2014 | Gantman | H04W 12/50 726/6 |
| 2017/0311204 | A1* | 10/2017 | Cariou | H04W 28/085 |
| 2018/0183723 | A1* | 6/2018 | Cariou | H04L 69/22 |
| 2018/0184428 | A1* | 6/2018 | Cariou | H04W 12/06 |
| 2018/0205502 | A1* | 7/2018 | Merlin | H04W 76/15 |
| 2018/0206174 | A1* | 7/2018 | Zhou | H04B 1/0483 |
| 2018/0206190 | A1 | 7/2018 | Cherian et al. | |
| 2018/0278697 | A1* | 9/2018 | Cariou | H04L 41/0246 |
| 2019/0075465 | A1* | 3/2019 | Grutzmacher | H04L 63/0876 |
| 2019/0082373 | A1* | 3/2019 | Patil | H04L 1/1614 |
| 2019/0150214 | A1* | 5/2019 | Zhou | H04W 76/15 370/329 |
| 2019/0335454 | A1* | 10/2019 | Huang | H04W 8/26 |
| 2019/0387435 | A1* | 12/2019 | Cariou | H04W 28/10 |
| 2020/0008254 | A1* | 1/2020 | Beck | H04L 1/0061 |
| 2020/0267541 | A1* | 8/2020 | Huang | H04W 76/15 |
| 2021/0050999 | A1* | 2/2021 | Huang | H04L 9/088 |
| 2021/0076437 | A1* | 3/2021 | Kneckt | H04W 12/0471 |
| 2021/0100051 | A1* | 4/2021 | Ho | H04W 12/03 |

OTHER PUBLICATIONS

Lan et al., Multi-Link BA Operation, IEEE 802.11-19/1575r0 Aug. 23, 2019 <<https://mentor.ieee.org/802.11/dcn/19/11-19-1575-00-00be-multi-link-ba-operation.pptx>>.

Abhishek Patil (Qualcomm): "Multi-Link Aggregation", IEEE Draft; 11-19-0823-02-00BE-MULTI-LINK-Aggregation, IEEE-SA Mentor, Piscataway, NJ USA vol. 802.11 EHT; 802.11be, No. 2 Sep. 17, 2019 (Sep. 17, 2019), pp. 1-11, XP068153829, Retrieved from the Internet: URL:https://mentor.ieee.org/802.11/dcn/19/ 11-19-0823-02-00be-multi-link-aggregation. pptx [retrieved on Sep. 17, 2019].

Quantenna et al: "Multi-Link Security And Aggregation Operations", IEEE Draft; 11-19-1963-00-OOBE-MULTI-Link-Security-and-Aggregation-Operations, IEEE-SA Mentor, Piscataway, NJ USA, vol. 802.11 EHT; 802.11be, Nov. 9, 2019 (Nov. 9, 2019), pp. 1-15, XP068164284, Retrieved from the Internet: URL:https://mentor.ieee.org/802.11/dcn/19/11-19-1963-00-00be-multi-link-security-and-aggregation-operations.pptx [retrieved on Nov. 9, 2019].

Quantenna et al: "Multi-Link Upper-MAC Entity Instance & New Frame MAC Header", IEEE Draft; 11-19-1962-00-OOBE-MULTI-LINK-UPPER-MAC-EN Tity-Instance-New-Frame-Mac-Header, IEEE-SA Mentor, Piscataway, NJ USA, vol. 802.11 EHT; 802.11be Nov. 9, 2019 (Nov. 9, 2019), pp. 1-16, XP068164285, Retrieved from the Internet:URL:https://mentor.ieee.org/802.11/dcn/19/ 11-19-1962-00-00be-multi-link-upper-mac-en tity-instance-new-frame-mac-header.pptx [retrieved on Nov. 9, 2019].

European Patent Application No. 20 200 226.7 Search Report mailed Mar. 4, 2021.

Xu C., et al., "A Novel Multipath-Transmission Supported Software Defined Wireless Network Architecture," In IEEE Access, Jan. 17, 2017, vol. 5, pp. 2111-2125, DOI:10.1109/ACCESS.2017.2653244.

Yonggang Fang (ZTE TX): "multi-link requirement discussion", IEEE Draft; XP068153644.

Examination Report in European Patent Application 20200226.7 mailed Oct. 13, 2023.

Office Action for Chinese Application No. 2020111499485, dated Dec. 23, 2024, 24 pages with machine translation.

Extended European Search Report of European Patent Application No. 24217139.5 mailed Feb. 5, 2025, 10 pages.

* cited by examiner

MULTI-LINK WIRELESS COMMUNICATIONS CONNECTIONS

CROSS-REFERENCE TO RELATED APPLICATIONS

This application is a continuation of U.S. patent application Ser. No. 17/027,455, filed on Sep. 21, 2020; which claims the benefit of U.S. Patent Application Ser. No. 62/924,934, filed on Oct. 23, 2019; the disclosures of which are incorporated herein by reference in their entireties.

FIELD

The field of the present disclosure relates in general to wireless communications including multi-link and specifically to frame and security operations thereof.

BACKGROUND

Home, office, and outdoor networks, a.k.a. wireless local area networks (WLAN) are established using a device called a Wireless Access Point (WAP). The WAP may include a router. The WAP wirelessly couples all the devices of the network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax", "be". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with single antenna single stream or multiple-antenna multi-stream transceivers concurrently, thereby increasing the time available for discrete MIMO video links to wireless HDTVs, computers tablets and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units.

The IEEE 802.11n and 802.11ac standards support increasing degrees of complexity in the signal processing required of fully compliant WLAN nodes including beamforming capability for focused communication of user data. One of the many capabilities of a fully compliant WLAN node under either of these standards is the ability to focus the signal strength of a transmitted communication toward a receiving device. Doing so requires multiple antenna and means for independently controlling the phase and amplitudes of the communication signals transmitted thereon.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

A method may include establishing a multi-link security association between a transmitter upper media access control (MAC) logic entity of a transmitter and a receiver upper MAC logic entity of a receiver. The transmitter may include one or more transmitter links. The receiver may include one or more receiver links.

BRIEF DESCRIPTION OF THE DRAWINGS

The structure and operation of the example implementations will be understood from a review of the following detailed description and the accompanying drawings in which like reference numerals refer to like parts and in which.

DETAILED DESCRIPTION

Figure 1:
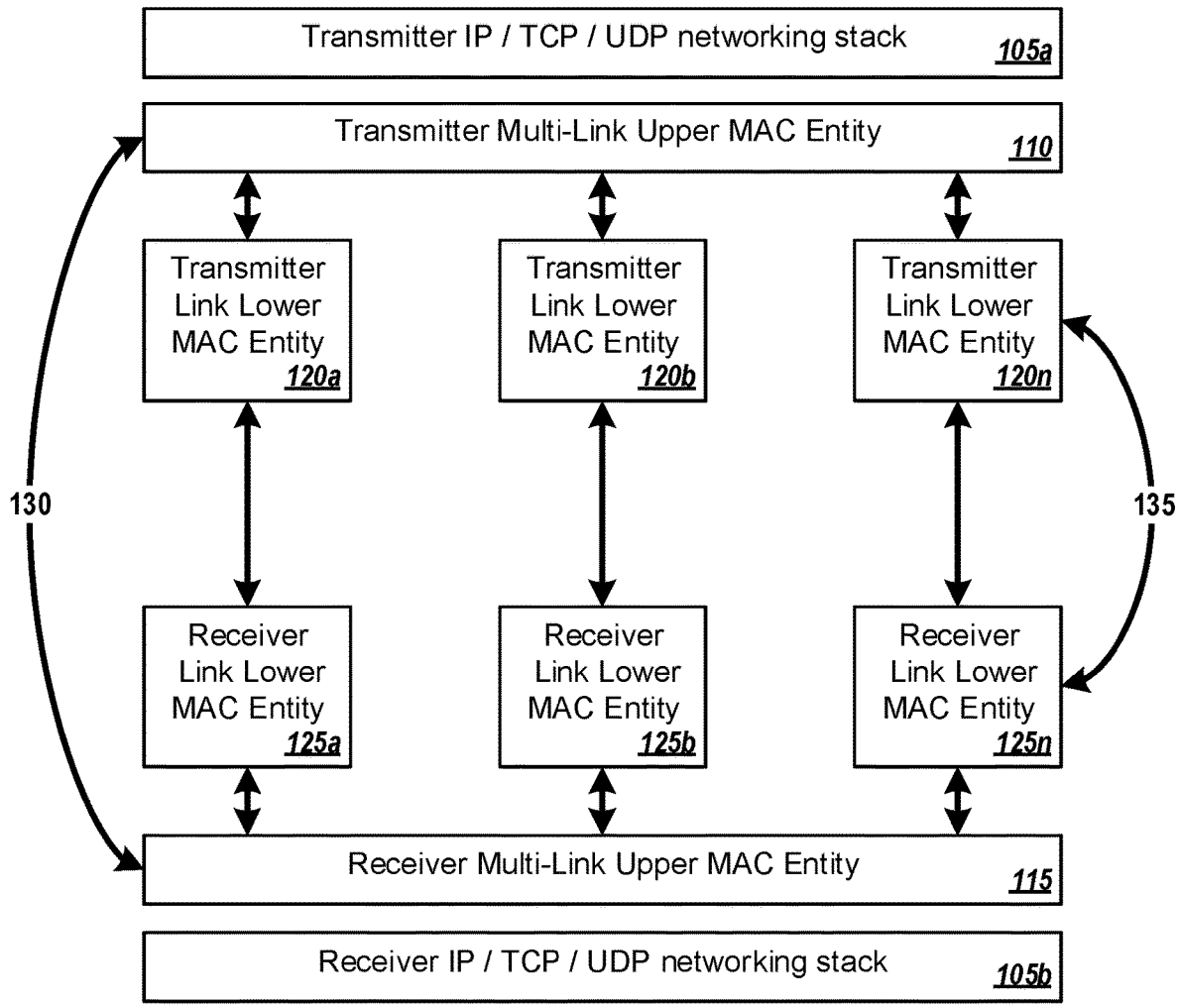
FIG. 1 illustrates an example multi-link wireless communications system.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

Conventional systems are not conducive to next-generation multi-link communications. For example, traditional wireless communication protocol fails to support identification of entities with multi-link connections. Moreover, existing headers and frame formats are unable to identify each entity in a multi-link system. Without identifying each entity in a multi-link system, communication may be difficult or not possible. Moreover, conventional systems are not able to establish a per-Traffic Identifier (TID) aggregation Block-ACK agreement at a multi-link upper MAC level, are not able to assign frame Sequence Number (SN) at the transmission side of multi-link upper MAC entity, and are not able to construct BlockACK response and conduct Rx window reordering operations at a receive side of multi-link upper MAC entity. Conventional systems are also not able to assign PNs and perform replay checks at a lower MAC level.

In an example, under conventional PN assignment systems, PNs are expected to arrive at a receiver in order. This may be problematic in multi-link systems that have multiple links where data may travel through links at different speeds. For example, a PN=10 may be sent via a first link and a PN=11 may be sent via a second link. If the PN=11 arrives before the PN=10, then a conventional system may treat the PN=10 as a replay and discard or not transmit further. Thus, conventional approaches may erroneously determine that data is a replay, when that data is actually valid data.

Aspects of the present disclosure address these and other shortcomings of conventional systems by providing a framework and improved methods to enable multi-link communications. Described herein are aspects related to multi-link Security Association (SA), a frame MAC header for multi-link, various transmit and receive process and systems to improve functionality, performance, and compatibility that address failures in conventional systems. In some embodiments, a multi-link entity (e.g., a transmitter or receiver) may include two or more links operating on different frequency bands. Each link may include a link-specific physical layer (PHY) and lower MAC layer. In at least one embodiment, unified upper MAC layer interfaces with individual link-specific lower MACs may provide a unified MAC Service Access Point (SAP) to a logical link control (LLC) and upper layers. In at least one embodiment, one or more multi-link upper MAC entities may provide SAP and LLC services to a data forwarding path, a distribution system, and a networking upper layer protocol stack. The one or more multi-link upper MAC entities may each have a discrete identity, which may be used to identify the multi-link upper MAC entities as a target or a source for a frame traversing through a multi-link data path. In at least one embodiment, multi-link frames that belong to a particular TID can be flexibly scheduled to be sent on any or each of the links belonging to or associated with the pair of the multi-link entities.

A per-link security association may be established at the multi-link lower MAC. In at least one embodiment, a transmitter/receiver association is established at multi-link upper MAC entity level, a Security Association (SA) is established at the multi-link upper MAC entity level with pairwise master key PMK and at, the per link lower MAC level, a Security Association may be established based on the multi-link upper MAC entity level PMK.

Example aspects of multi-link implementations include providing per-SSID multi-link upper MAC entities and their identities; security association between multi-link upper MAC entities, a per-link Pairwise Transient Key Security Association (PTKSA) and Group Transient Key Security Association (GTKSA) key exchange, transmitter-side PN number assignment, and receiver-side replay check procedures, transmitter-side BlockACK window management, receiver-side BlockACK window reordering management, and a BlockACK retry procedure at the multi-link upper MAC level. Additional aspects may include per TID aggregation BlockACK agreements are established between the transmitter multi-link upper MAC entity and receiver multi-link upper MAC entity, frame sequence number assignment for multi-link frames can be done at the transmitter side multi-link upper MAC entity, receiver side window reorder operations can be done at the receiver side multi-link upper MAC entity, and BlockACK and frame retry procedures may be done at the multi-link upper MAC level.

To carry the multi-link information of the transmitter multi-link upper MAC entity ID and the receiver multi-link upper MAC entity ID, a new frame MAC header format may be used. As provided herein, the multi-link frame MAC header format enables differentiation between multi-link frames and existing frame formats (e.g., prior to IEEE 802.11be). An example aspect of the multi-link frame MAC header enables identification of a receiver side multi-link upper MAC entity and transmitter side multi-link upper MAC entity. The multi-link MAC layer processing can be applied based on the configuration options of a particular multi-link upper MAC entity.

FIG. 1 illustrates an example multi-link wireless communications system 100. The multi-link wireless communications system 100 may include an Internet Protocol (IP)/Transmission Control Protocol (TCP)/User Datagram Protocol (UDP) networking stack 105. The system may include a transmitter IP/TCP/UDP networking stack 105a and a receiver IP/TCP/UDP networking stack 105b. The transmitter IP/TCP/UDP networking stack 105a may be associated with a transmitter multi-link upper MAC entity 110 that may be associated with a transmitter, such as an access point (AP). A receiver, such as a station (STA), may include a receiver multi-link upper MAC entity 115. The transmitter multi-link upper MAC entity 110 and the receiver multi-link upper MAC entity 115 may be associated with each other to enable multi-link communications between the transmitter and receiver. The transmitter multi-link upper MAC entity 110 and the receiver multi-link upper MAC entity 115 may be logic entities.

The transmitter may include one or more wireless radios. Each radio may be associated with one or more link lower MAC entities (which may be referred to herein as link lower MAC entities or lower MAC links). Multi-link upper MAC entities may coordinate communication over the radios using the one or more link lower MAC entities. As illustrated in FIG. 1, the transmitter multi-link upper MAC entity 110 is coupled to three links: transmitter link lower MAC entity 120a, transmitter link lower MAC entity 120b, and transmitter link lower MAC entity 120n (collectively, transmitter link lower MAC entities 120). The transmitter multi-link upper MAC entity 110 may interface with the transmitter link lower MAC entities 120. Any number of transmitter link lower MAC entities 120 may be included in the multi-link wireless communications system 100.

As illustrated the receiver multi-link upper MAC entity 115 is coupled to three links: receiver link lower MAC entity 125*a*, receiver link lower MAC entity 125*b*, and receiver link lower MAC entity 125*n* (collectively, receiver link lower MAC entities 125). The receiver multi-link upper MAC entity 115 may interface with the receiver link lower MAC entities 125. Any number of receiver link lower MAC entities 125 may be included in the multi-link wireless communications system 100. In at least one embodiment, there may be more or fewer transmitter link lower MAC entities 120 than there are receiver link lower MAC entities 125.

In an example, the transmitter link lower MAC entities 120 may include a 2.4 GHz link, a 5 GHz link, or a 6 GHz link. For example, the transmitter link lower MAC entity 120*a* includes a 2.4 GHz link, the transmitter link lower MAC entity 120*b* includes a 5 GHz link, and the transmitter link lower MAC entity 120*n* includes a 6 GHz link. Similarly, the receiver link lower MAC entities 125 may include any of a 2.4 GHz link, a 5 GHz link, or a 6 GHz link.

A security association (SA) between the transmitter multi-link upper MAC entity 110 and the receiver multi-link upper MAC entity 115 may be created at a multi-link upper MAC entity 130. In an example, the SA may be established between transmitter multi-link upper MAC entity 110 and the receiver multi-link upper MAC entity 115 using an authentication protocol, such as 802.1x, Pre-Shared Key (PSK), Simultaneous Authentication of Equals (SAE), etc. A result of establishing the SA at the multi-link upper MAC level 130 may include a mutually derived PMK. This PMK may be used to derive per-link PTKSA, such as through a 4-way key exchange process.

At a lower MAC level 135, the transmitter link lower MAC entities 120 and the receiver link lower MAC entities 125 may be associated on a per-link basis, such as using at least one of a PTKSA and/or a GTKSA.

Regarding the per-link PTKSA, once the Multi-Link SA is established with the mutually derived PMK at the multi-link upper MAC level 130, then at the lower MAC level 135 and on a per-link basis, a PTKSA 4-way key exchange process may be invoked to derive a per-link PTK[link] using a key derivation function (KDF). An example algorithm for generating per-link PTK[link] is provided, with the input parameters of: PMK, AP_per_Link_nonce, STA_per_Link_nonce, AP_per_Link_MAC_address, STA_per_Link_MAC_address:

PTK[link]=KDF(PMK,AP_Lower_MAC[link],AP_nonce[link],STA_Lower_MAC[link],STA_nonce[link])

Regarding the per-link GTKSA, a per-link GTK[link] may initially be delivered to the receiver per link lower MAC entity to the receiver during the PTKSA 4-way key exchange, and the subsequent GTK[link] rekey process may be performed through a per-link 2-way key exchange.

As a result, from one or both of the PTKSA and GTKSA, a transmitter 1 link lower MAC entity 120 may be associated with a corresponding receiver link lower MAC entity 125 forming a link pair. Links in the link pair may be a same type of link. For example, a link pair may include two 5 GHz links. Each link pair may include a separate PTK and GTK. In an example, the transmitter link lower MAC entity 120*a* and the receiver link lower MAC entity 125*a* may form a first link pair, the transmitter link lower MAC entity 120*b* and the receiver link lower MAC entity 125*b* may form a second link pair, and the transmitter lower link lower MAC entity 120*n* and the receiver link lower MAC entity 125*n* may form a "nth" link pair.

In operation, MAC Protocol Data Unit (MPDU) sequence number (SN) assignment, BlockACK window management, MPDU Rx window reordering, and BlockACK responses may be handled at the at multi-link upper MAC level 130. MPDU packet number (PN) assignment, encryption, decryption, and replay checking may be handled at the link lower MAC level 135. In at least one embodiment, the PN may include an integer (e.g., 48 bit) for replay checking purposes.

The transmitter multi-link upper MAC entity 110 may construct frames for communication through the multi-link system 100. In at least one embodiment, the transmitter multi-link upper MAC entity may encapsulate packets that may be received from a source. The packets from the source may include a header with various information, including a destination address, a source address, a type, a quality of service (QoS) marking, etc. The transmitter multi-link upper MAC entity may encapsulate the packet from the source into a Multi-Link frame format and assign various fields to a multi-link header, such as a receiver Multi-Link Entity ID (MLE ID1), a transmitter Multi-Link Entity ID (MLE ID 2), an address 1 field (RA=receiver LinkX Lower MAC address), an address 2 field (TA=transmitter LinkX Lower MAC address), a TID, which may be mapped from the QoS marking in the header of the packet from the source, a sequence number (SN), which may include a next SN of the TID from a Tx BlockACK window.

To improve throughput, MPDUs belonging to the same TID may be transmitted over multiple links. In at least one embodiment, a transmitter side of the lower MAC level 135 may perform the allocation of MPDUs to different links. A same PN space may be used across all links, or each link may have a separate PN space.

A transmitter link lower MAC entity may assign a monotonic increasing PN to each MPDUs and may apply encryption to the MPDUs. The transmitter link lower MAC entity may transmit the MPDUs as a single MPDU (S-MPDU) or an aggregated MPDU (A-MPDU).

A receiver link lower MAC entity may receive the MPDUs. The receiver link lower MAC 135 may consolidate the MPDUs arriving over the different links, perform a cyclic redundancy code (CRC), decryption, conduct Rx replay operations, perform BlockACK operations, MPDUs reordering, etc. In at least one embodiment, the receiver link lower MAC entity may pass the MPDUs to the receiver multi-link upper MAC entity and the receiver multi-link upper MAC entity may send a BlockACK (partial state or full state) to the transmitter multi-link upper MAC entity. The receiver multi-link upper MAC entity may release the frames to a next stage of a forwarding path, or to the receiver IP/TCP/UDP networking stack 105*b*.

In at least one embodiment, a consolidated acknowledgment may be transmitted from the receiver side of the lower MAC level 135 to the transmitter side of the lower MAC level 135 over any of the links. In at least one embodiment, a BlockACK frame may consolidate acknowledgments for MPDUs received over the different links. The BlockACK frame may be transmitted over any of the links. In at least one embodiment, failed MPDUs may be re-transmitted on the same link, or on a link different from the link used for the original transmission.

Figure 2:
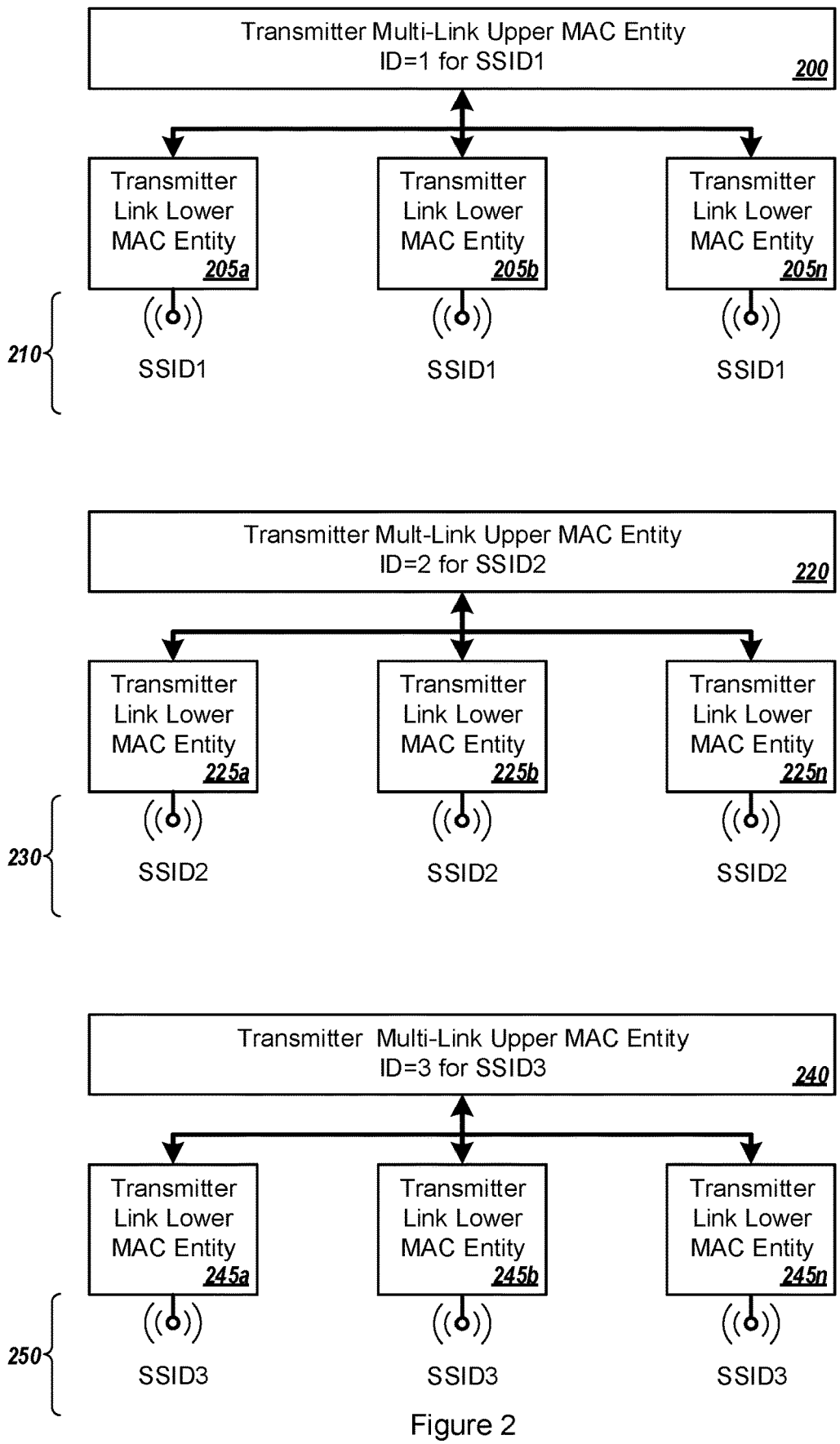
FIG. 2 illustrates example service set identifier (SSID) configurations for a multi-link device.

FIG. 2 illustrates example SSID configurations for a multi-link device (e.g., an AP). The multi-link device may be configured with one or more SSIDs. The particular multilink device, for example, may be configured with one or more than one multi-link upper MAC entities, where each of the multi-link upper MAC entities may be associated with a unique SSID. Each of the one or more multi-link upper MAC entities may be associated with one or more link lower MAC entities.

As illustrated, the multi-link device may be configured with three SSIDs, where each SSID is associated with a respective multi-link upper MAC entity. Each of the three illustrated multi-link upper MAC entities may be configured for a unique SSID. For example, a first multi-link upper MAC entity 200 with a numeric identifier of "1" may be associated with an SSID1 210 and any number of link lower MAC entities (e.g., link lower MAC entities 205a, 205b, and 205n). A second multi-link upper MAC entity 220 with a numeric identifier of "2" may be associated with an SSID2 230 and any number of link lower MAC entities (e.g., link lower MAC entities 225a, 225b, and 225n). A third multi-link upper MAC entity 240 with a numeric identifier of "3" may be associated with an SSID3 250. and any number of link lower MAC entities (e.g., link lower MAC entities 245a, 245b, and 245n). While three SSIDs are illustrated, the multi-link device may be configured for any number of SSIDs. In at least one embodiment, a second transmitter upper MAC logic entity may be instantiated for a second SSID.

In at least one embodiment, the multi-link upper MAC entities may be identified by their respective numeric identifier. Additionally or alternatively, the multi-link upper MAC entities may have a MAC address that may be represented to a Distribution System (DS) or to a Networking Stack. In an example, the multi-link upper MAC entities can either use an address of an associated link lower MAC entity or may use a unique MAC address that may be assigned, such as by a network system administrator. Identities of the one or more multi-link upper MAC entities may also be used for basic service set (BSS) operations, such as association and security association procedures, as described herein.

Figure 3:
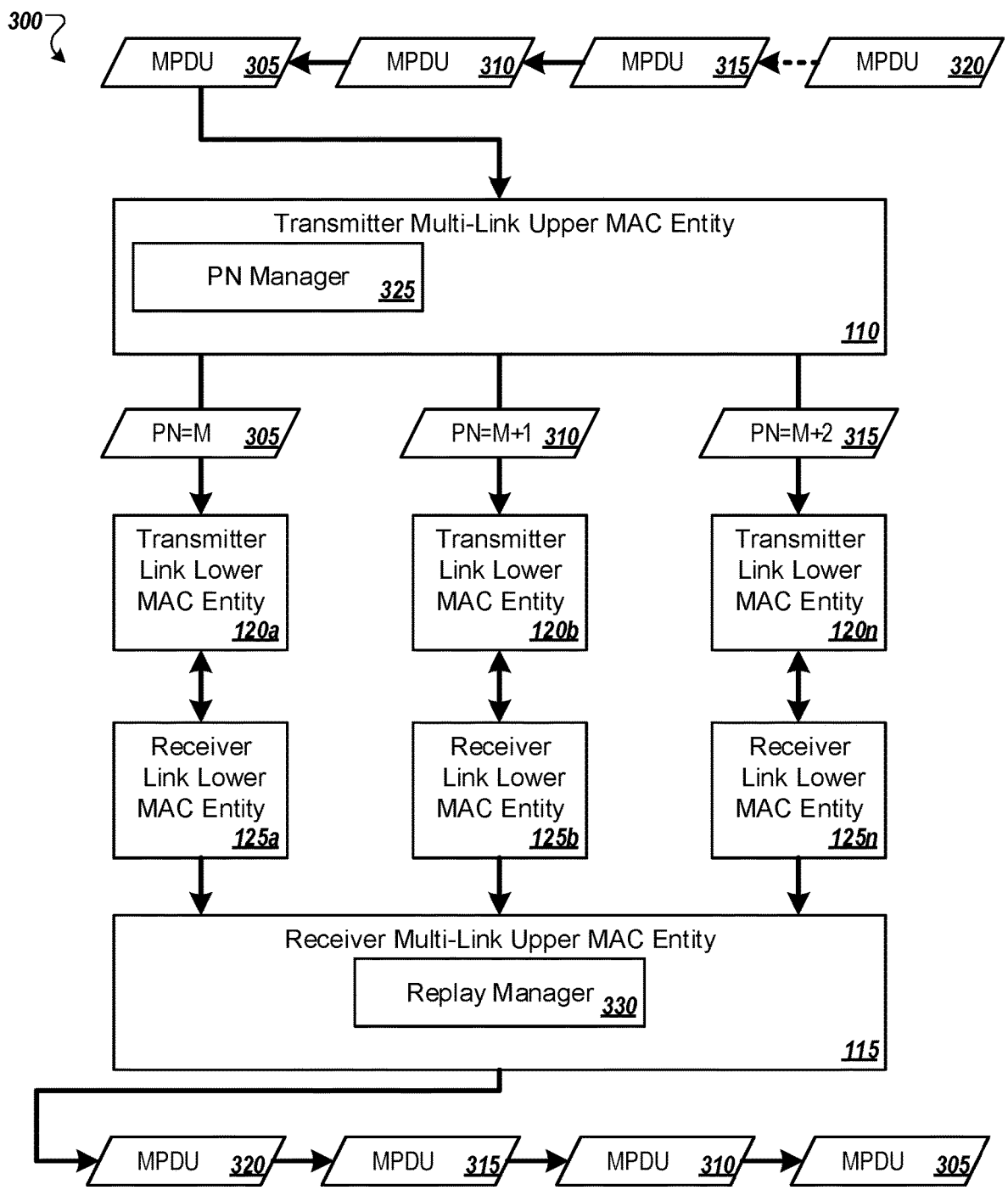
FIG. 3 illustrates an example system where packet numbers (PNs) may be assigned at a multi-link upper MAC level.

FIG. 3 illustrates an example system 300 where packet numbers (PNs) may be assigned at a multi-link upper MAC level, which may include the transmitter multi-link upper MAC entity 110. The system 300 may additionally include the transmitter link lower MAC entities 120, the receiver link lower MAC entities 125 and the receiver multi-link upper MAC entity 115. In at least one embodiment, PNs may be assigned at the transmitter multi-link upper MAC entity 110, and replay checking may be performed at the receiver multi-link upper MAC entity 115. In at least one embodiment, the PNs may be assigned in monotonic order. The system 300 may operate under the multi-link security association and per link PTKSA & GTKSA framework described herein. In at least one embodiment, the PNs may be assigned in monotonic order. Each link, or link pair, may have a separate PN space.

The system 300 may receive one or more MAC Service Data Unit (MPDU) (e.g., MPDUs 305, 310, 315, and 320) with a particular TID. The transmitter multi-link upper MAC entity 110 may include a PN manager 325. The PN manager 325 may assign PNs to each MPDU. As illustrated, the system may receive a MPDU 305 and the PN manager 325 may assign a PN=M to the MPDU 305. Similarly, the PN manager 325 may assign PN=M+1 to a MPDU 310, PN=M+2 to a MPDU 315, and PN=M+N to a MPDU 320. In at least one embodiment, each of the MPDUs 305, 310, 315, and 320 are associated with a same TID. The MPDUs 305, 310, 315, and 320 may be sent from the transmitter to the receiver using different links. For example, and as illustrated, the MPDU 305 may be transmitted via the transmitter link lower MAC entity 120a to the receiver link lower MAC entity 125a. Similarly, the MPDU 310 may be transmitted via the transmitter link lower MAC entity 120b to the receiver link lower MAC entity 125b and the MPDU 315 may be transmitted via the transmitter link lower MAC entity 120n to the receiver link lower MAC entity 125n. In this manner, the system 300 may provide multi-link communication of the MPDUs.

In at least one embodiment, transmissions between the transmitter link lower MAC entity 120 and the receiver link lower MAC entity 125 may be encrypted, such as using PTK with a symmetric cypher. In at least one embodiment, a transmitter and receiver link lower MAC entity pair (e.g., the transmitter link lower MAC entity 120a and the receiver link lower MAC entity 125a) may share a link-specific PTK that may be used to encrypt and decrypt traffic between the two links in the link pair.

In at least one embodiment, the receiver multi-link upper MAC entity 115 may perform a replay check on one or more of the MPDUs 305, 310, 315, and 320 using the PNs assigned by the transmitter multi-link upper MAC entity 110. The receiver multi-link upper MAC entity 115 may include a replay manager 330 that may perform the replay check. A replay attack typically involves an interception of valid data. The valid data is then replayed or delay in an attempt to gain access to a system. As a way to thwart a replay attack, the replay manager 330 may check an order of the PNs of the MPDUs. A replay checking failure may indicate a security breach. For a PN assignment scheme that increments the PN number for each subsequent MPDU, the replay manager 330 may discard any PNs that have lower PNs than the most recent MPDU.

Figure 4:
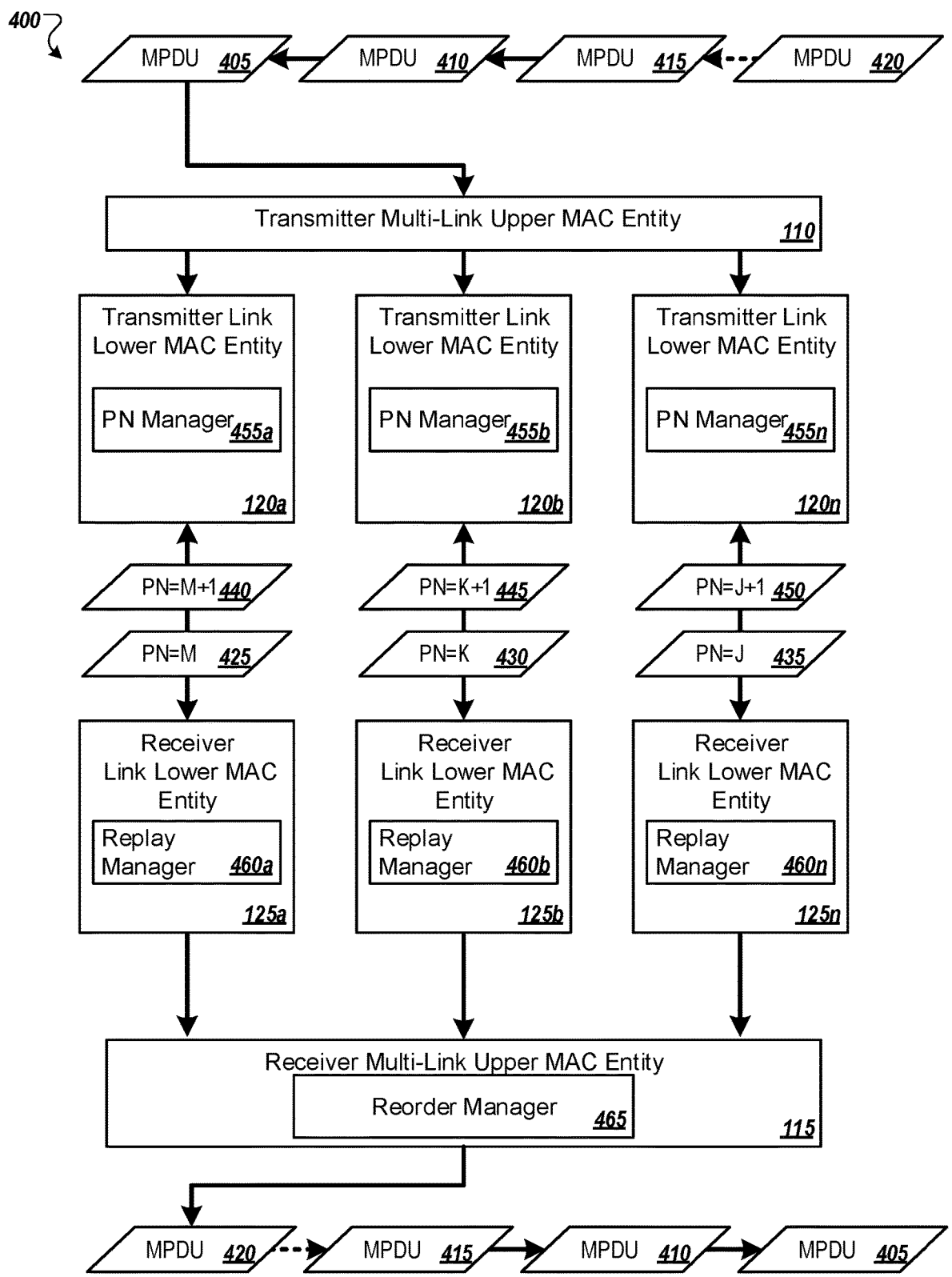
FIG. 4 illustrates an example system where PNs may be assigned at one or more link lower MAC entities.

FIG. 4 illustrates an example system 400 where PNs may be assigned to MPDUs at one or more link lower MAC entities. The system 400 may include the transmitter multi-link upper MAC entity 110, the transmitter link lower MAC entities 120, the receiver link lower MAC entities 125, and the receiver multi-link upper MAC entity 115. The transmitter link lower MAC entities 120 may assign the PNs, such as on a per-link basis. The system 400 may operate under the multi-link security association and per link PTKSA & GTKSA framework described herein. In at least one embodiment, the PNs may be assigned in monotonic order. Each link, or link pair, may have a separate PN space. In at least one embodiment, per link PTKSA & GTKSA details are not shared with the multi-link upper MAC layer 130. In a multi-link environment, PNs assigned at one or more link lower MAC entities may provide advantages over PNs that are assigned at a multi-link upper MAC entity because of increased ability for more accurate replay checking and reordering, as described in this document.

The system 400 may receive one or more MPDUs 405, 410, 415, 420 with a particular TID. The transmitter multi-link upper MAC entity 110 may pass the MPDUs 405, 410, 415, 420 to the transmitter link lower MAC entities 120. Each of the transmitter link lower MAC entities 120 may include a respective PN manager 455. As illustrated, a MPDU 425 and a MPDU 440 may be passed to the transmitter link lower MAC entity 120a, where a PN manager 455a may assign a PN=M to the MPDU 425 and a PN=M+1 to MPDU 440. Similarly, MPDU 430 and MPDU 445 may be passed by the transmitter multi-link upper MAC entity 110 to the transmitter link lower MAC entity 120b. A PN manager 455b may assign PN=K to MPDU 430 and PN=K+1 to MPDU 445. MPDU 435 and MPDU 450 may be passed by the transmitter multi-link upper MAC entity 110 to the link lower MAC entity 120n. A PN manager 455n may assign PN=J to MPDU 435 and PN=J+1 to MPDU 450. In at least one embodiment, the MPDUs 405, 410, 415, 420 may be passed to the transmitter link lower MAC entities 120 by being placed into different links based on respective channel access conditions. At a given moment, if one particular link has channel access, then a MPDU may be sent from this link to transmit. Additionally or alternatively, the MPDUs 405, 410, 415, 420 may be passed by the transmitter multi-link upper MAC entity 110 to the transmitter link lower MAC entities 120 by being placed into different links based on various parameters, such as link bandwidth capacity, interference conditions, etc. A link with a higher bandwidth capacity above a bandwidth capacity threshold, and/or with a low interference level below an interference threshold, for example, may be used to send more MPDUs. A link with lower bandwidth capacity (e.g., below the bandwidth capacity threshold) or high interference (e.g., above the interference threshold) may be used to send fewer MPDUs.

The MPDUs 425, 430, 435, 440, 445, and 450 may be sent, via a respective transmitter link lower MAC entity 120 to a corresponding receiver link lower MAC entity 125. In at least one embodiment, transmissions between the transmitter link lower MAC entity 120 and the receiver link lower MAC entity 125 may be encrypted, such as using PTK with a symmetric cypher. In at least one embodiment, a transmitter and receiver link lower MAC entity pair (e.g., the transmitter link lower MAC entity 120a and the receiver link lower MAC entity 125a) may share a link-specific PTK that may be used to encrypt and decrypt traffic between the two links in the link pair.

On the receiver side, a replay check may be performed at the receiver per link lower MAC entities. In at least one embodiment, a replay check may be performed on a per-link or per-link pair basis. Each of the receiver link lower MAC entities 125 may include a respective replay manager 460. As illustrated, the receiver link lower MAC entity 125a may include a replay manager 460a, the receiver link lower MAC entity 125b may include a replay manager 460b, and the receiver link lower MAC entity 125n may include a replay manager 460n.

Since the PN is assigned on a per-link basis by the PN manager 455 at the transmitter per link lower MAC entity, each link may maintain its own monotonic increase PN[link] space and a risk of false positives may be decreased. For example, false positives may be introduced when sending MPDUs over different links of different speeds and PHY rates. Those different speeds may cause MPDUs with higher PNs to arrive before other valid MPDUs with lower PNs. In that situation, the valid MPDUs with the lower PNs would be treated as replays and discarded. By performing the PN assignment and replay check on a per-link basis, the above mentioned false positive situation can be prevented. Thus, replay checking may be done on a per-link basis by the respective replay manager 460 at the receiver lower MAC level 135.

Once replay checks have been performed at the replay managers 460, the receiver link lower MAC entities 125 may pass the MPDUs to the receiver multi-link upper MAC entity 115.

The receiver multi-link upper MAC entity 115 may include a reorder manager 465. The reorder manager 465 may perform reorder operations to ensure that MPDUs received over the various links are in order. To check the order of the MPDUs, the reorder manger 465 may identify, for each MPDU, a sequence number (SN) that was assigned by the transmitter multi-link upper MAC entity 110. If any of the SNs are out of order, the reorder manger 464 may reorder the MPDUs such that the MPDUs are sent to the destination address in a correct order.

Figure 5:
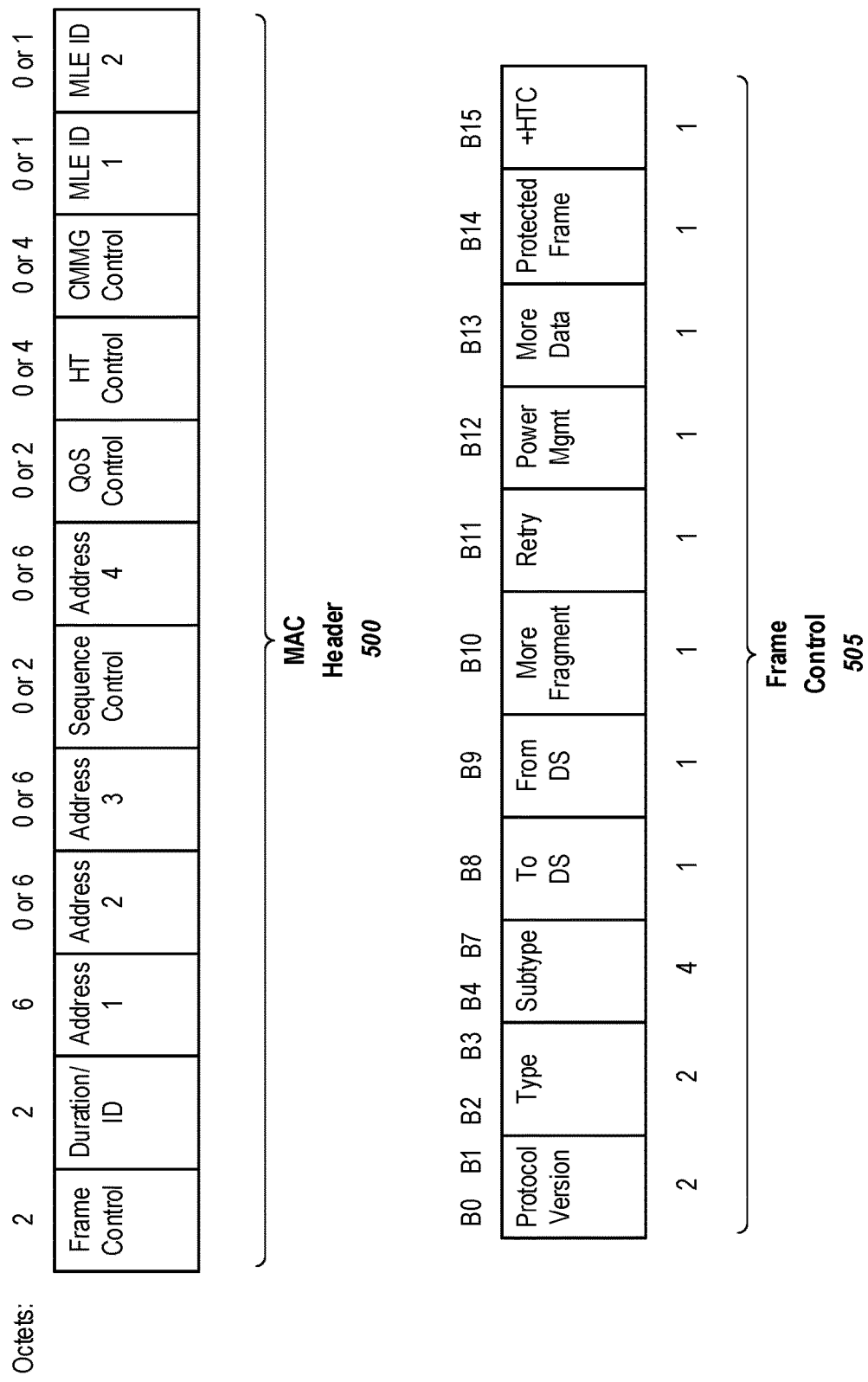
FIG. 5 illustrates an example multi-link frame MAC header.

FIG. 5 illustrates an example multi-link frame MAC header 500. The multi-link frame MAC header 500 may be constructed by a transmitter multi-link upper MAC entity during an encapsulation process. To facilitate communication through a multi-link system, the MAC header 500 may include identification of each point of the multi-link system so that the frame can be properly processed (e.g., for replay checks and reordering operations) and forwarded from a source device to an ultimate destination device. These identifications of each point of the multi-link system are carried in the multi-link frame MAC header 500. These identifications in the multi-link frame MAC header 500 may identify some or all of the following: transmitter multi-link upper MAC entity ID, receiver multi-link upper MAC entity ID, per Link Transmitter address (TA), per Link Receiver address (RA), frame's source address, and destination address (DA).

In at least one embodiment, the transmitter multi-link upper MAC entity may encapsulate packets that may be received from a source. The packets from the source may include a destination address, a source address, a type, a quality of service (QoS) marking, etc. The transmitter multi-link upper MAC entity may encapsulate the packet from the source into a Multi-Link frame format and assign various fields to a multi-link MAC header, such as a receiver Multi-Link Entity ID (MLE ID1), a transmitter Multi-Link Entity ID (MLE ID 2), an address 1 field (RA=receiver LinkX lower MAC address), an address 2 field (TA=transmitter LinkX lower MAC address), a TID, which may be mapped from the QoS marking in the header of the packet from the source, a sequence number (SN), which may include a next SN of the TID from a Tx BlockACK window. The SN may be used for Rx reordering, such as to ensure that frames associated with the same TID are released in order.

The multi-link frame MAC header 500 may include a frame control field 505. The frame control field 505 may provide a "Protocol Version" field that may be used to inform devices a protocol of the multi-link frame MAC header 500. For example, the protocol version field may indicate a particular wireless protocol, such as with a value 00b (which may indicate a prior MAC header format) or a value 01b (which may indicate a Multi-Link MAC header format, where one or both MLE ID 1 and MLE ID 2 fields are present). In an example implementation, the frame control field 505 Protocol Version field may include any value to indicate the Multi-Link frame MAC header is used.

FIGS. 6-11 illustrate flow diagrams of example methods related to multi-link communication. The methods may be performed by processing logic that may include hardware (circuitry, dedicated logic, etc.), software (such as is run on a general purpose computer system or a dedicated machine), or a combination of both, which processing logic may be included in any transmitter (e.g., AP) or receiver (e.g., STA), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 6:
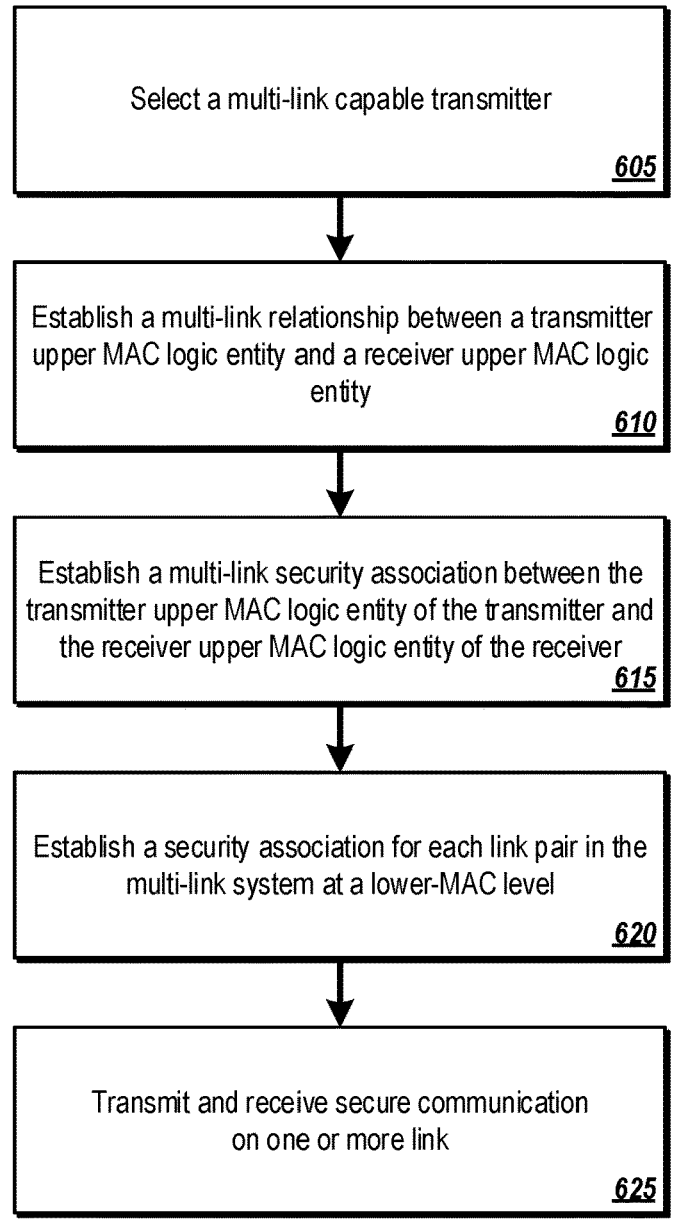
FIG. 6 illustrates a flow diagram of an example method to provide multi-link communications.

FIG. 6 illustrates a flow diagram of an example method 600 to provide multi-link communications. The method 600 may begin at block 605, where processing logic may select a multi-link capable transmitter from a list of available transmitters based on beacon advertising information indicating that the transmitter has multi-link support. In at least one embodiment, the beacon advertising information may include an identifier and/or a link type of available transmitter links.

At block 610, the processing logic may establish a multi-link relationship between a transmitter multi-link upper MAC entity of a transmitter and a receiver multi-link upper MAC entity of a receiver. In at least one embodiment, the multi-link relationship may be used to determine a number of links available for multi-link use.

At block 615, the processing logic may establish a multi-link security association between the transmitter multi-link upper MAC entity of the transmitter and the receiver multi-link upper MAC entity of the receiver. In at least one embodiment, the transmitter may include a first transmitter link and a second transmitter link and the receiver may include a first receiver link and a second receiver link. In at least one embodiment, establishing the multi-link security association between the transmitter multi-link upper MAC entity of the transmitter and the receiver multi-link upper MAC entity of the receiver include mutually deriving a PMK.

At block 620, the processing logic may establish a security association for each link pair in the multi-link system at a lower MAC level. For example, a transmitter and a receiver may include one or more corresponding links of a same type that can be paired for communication. For example, a transmitter 5 GHz link may be paired with a receiver 5 GHz link. In at least one embodiment, the first transmitter link may be associated with the first receiver link at the lower MAC level with a PTKSA that is created using a four-way key exchange using the mutually derived PMK, a first transmitter link nonce, a first receiver link nonce, a first transmitter link address, and a first receiver link address. In at least one embodiment, the security association for each link pair in the multi-link system at a lower MAC level may also include a GTKSA that is derived during the four-way key exchange and established using a two-way key exchange at the lower MAC level and between the first transmitter link and the first receiver link. In at least one embodiment, establish a security association for each link pair in the multi-link system at a lower MAC level may include associating the first transmitter link with the first receiver link at a lower MAC level and associating the second transmitter link with the second receiver link at the lower MAC level.

At block 625, the processing logic may transmit and receive secure communication on one or more link of the relationship. In at least one embodiment, the communication may be secured using each of the derived PTKs with a symmetric cypher (e.g., Counter Mode with Cipher Block Chaining Message Authentication Code Protocol (CCMP), Galois/Counter Mode Protocol (GCMP), etc.). Thus, method 600 may provide aspects related to multi-link security association at the upper MAC level and at the lower MAC level to improve functionality, performance, and compatibility that address failures in conventional systems.

Figure 7:
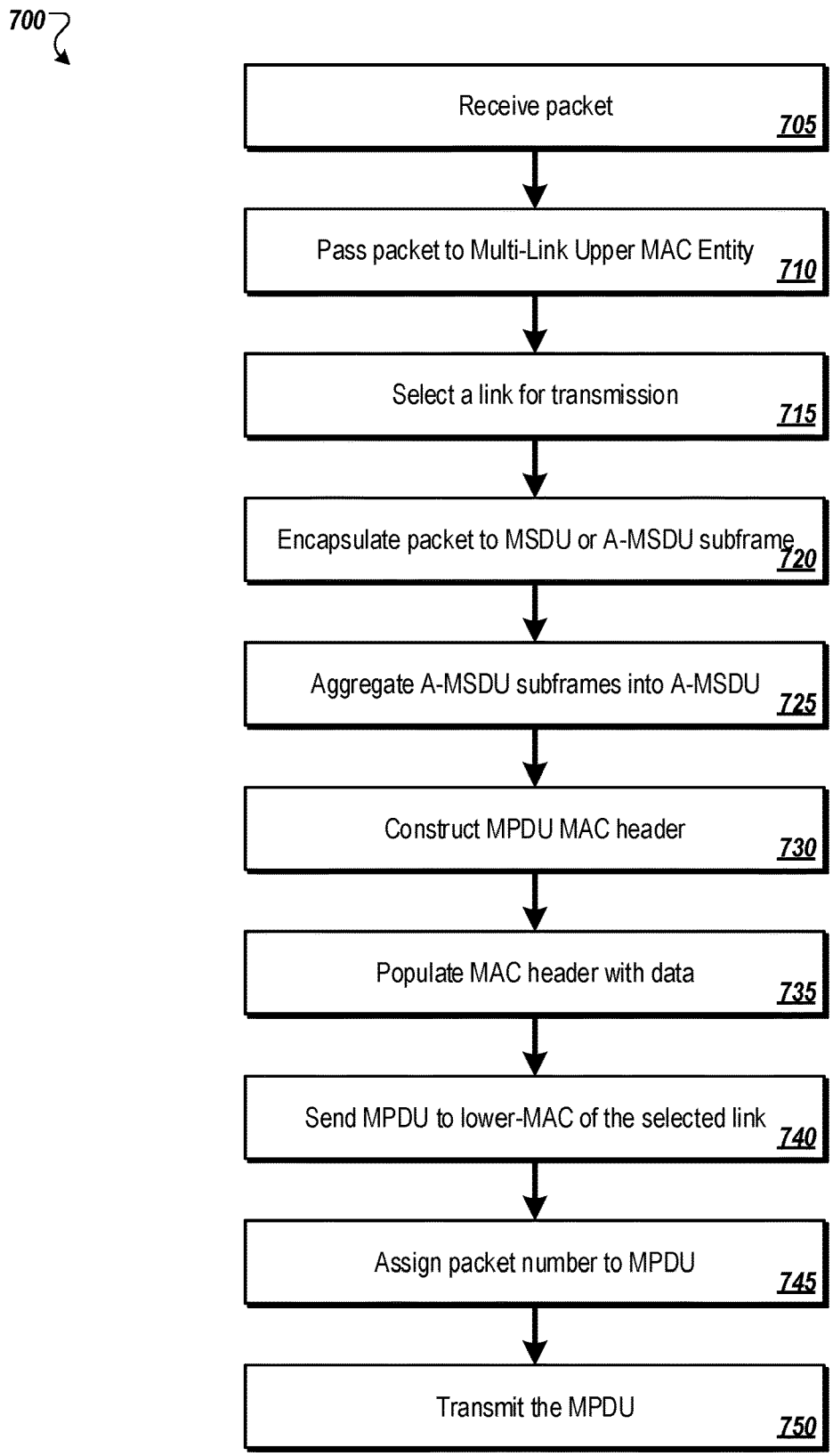
FIG. 7 illustrates a flow diagram of an example method of a transmitter flow in a multi-link system.

FIG. 7 illustrates a flow diagram of an example method 700 of a transmitter flow in a multi-link system. The method 700 may begin at block 705, where processing logic may receive a packet, such as from a distribution system. The packet may include a destination address, a source address, a type, a quality of service (QoS) marking, etc.

At block 710, the processing logic may pass the packet to a multi-link upper MAC entity, such as the multi-link upper MAC entity 110. At block 715, the processing logic may select a link for transmission of the packet.

At block 720, the processing logic may encapsulate the packet into a MSDU or an A-MSDU subframe and assign various fields that may be included in a multi-link MAC header. At block 725, the processing logic may aggregate two or more MSDUs or two or more A-MSDU subframes into an Aggregate MAC Service Data Unit (A-MSDU).

At block 730, the processing logic may construct a MAC Service Data Unit (MSDU) with the multi-link MAC header. At block 735, the processing logic may populate the multi-link MAC header with various data. In at least one embodiment, the processing logic may populate the multi-link MAC header with a receiver Multi-Link Entity ID (MLE ID1), a transmitter Multi-Link Entity ID (MLE ID 2), an address 1 field (RA=receiver LinkX lower MAC address), an address 2 field (TA=transmitter LinkX lower-MAC address), a TID, which may be mapped from the QoS marking in the header of the packet from the source, a sequence number (SN), which may include a next SN of the TID from a Tx BlockACK window.

At block 740, the processing logic may send the MPDU with the multi-link MAC header to the link that was selected at block 715. In at least one embodiment, the processing logic may send the MPDU to the transmitter link lower-MAC.

At block 745, the processing logic may assign a packet number (PN) to the MPDU. In at least one embodiment, the PN is assigned at the transmitter link lower-MAC. In at least one embodiment, the PN is assigned at the multi-link upper MAC entity. At block 750, the processing logic may transmit the MPDU to a receiver link that is associated with the selected link. In at least one embodiment, MPDUs may be aggregated in an A-MPDU. In at least one embodiment, MPDUs and/or A-MPDUs may be transmitted from the transmitter link lower-MAC to the receiver link lower-MAC in a Physical Layer Convergence Procedure (PLCP) Protocol Data Unit (PPDU). Thus, method 700 may improve functionality, performance, and compatibility by providing benefits that address failures in conventional systems. Such benefits may be provided to transmitters in multi-link systems to support identification of entities with multi-link connections, provide headers and frame formats to identify each entity in a multi-link system, establish a per-TID aggregation BlockACK agreement at a multi-link upper MAC level, and assign frame SNs at the transmission side of multi-link upper MAC entity.

Figure 8:
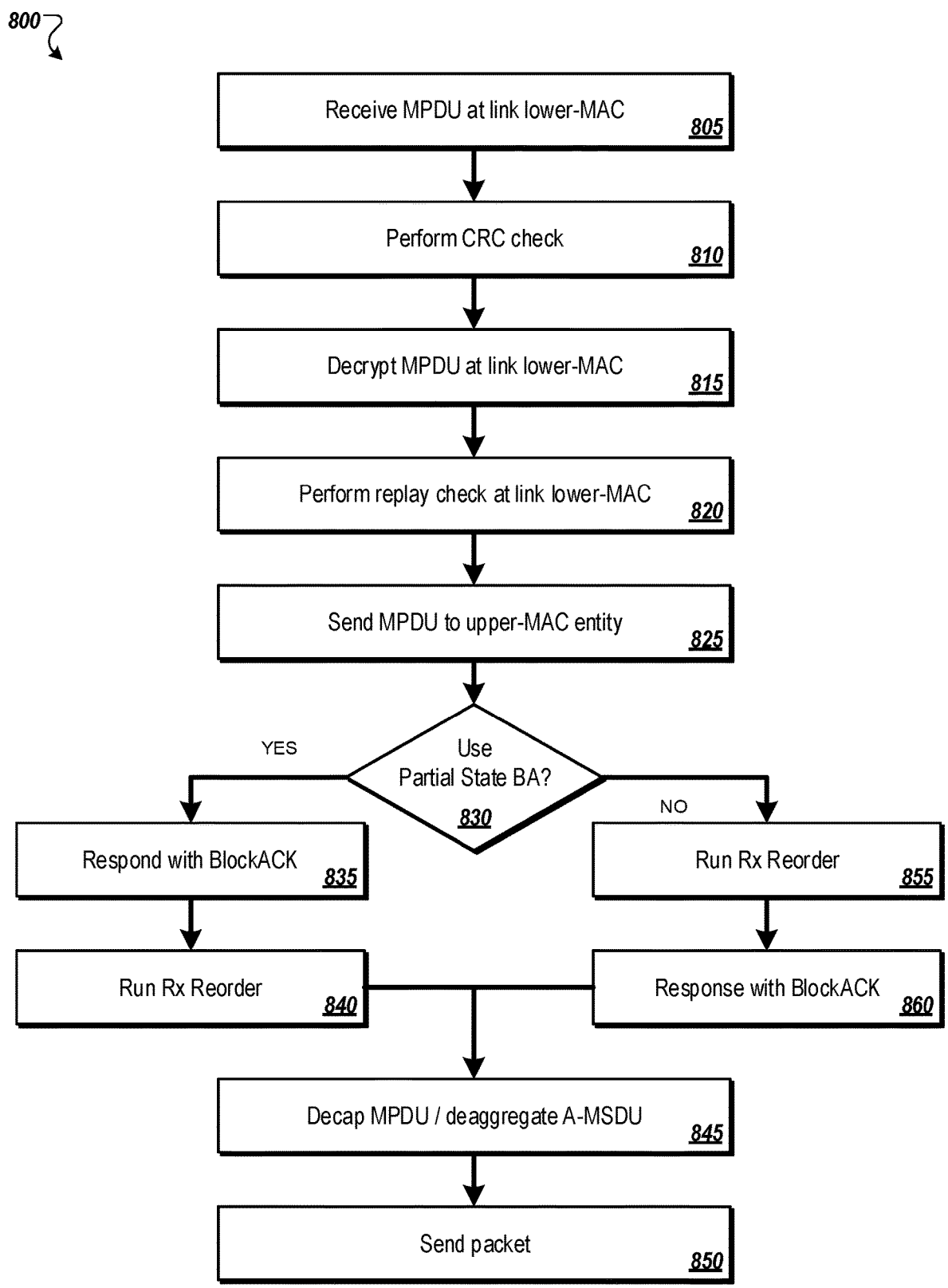
FIG. 8 illustrates a flow diagram of an example method of a receiver flow in a multi-link system.

FIG. 8 illustrates a flow diagram of an example method 800 of a receiver flow in a multi-link system. The method 800 may begin at block 805, where processing logic may receive a MPDU at a receiver link lower MAC entity, which may include the receiver link lower MAC entity 125. The MPDU received at the receiver link lower MAC entity may include the MPDU (or A-MPDU) that was transmitted by the transmitter link lower MAC entity in FIG. 7.

At block 810, the processing logic may perform a CRC check to check the integrity of the packet on the receiving end. The receiving end computes a CRC value over the received MPDU and compares the computed value with a frame check sequence of the MPDU. If the values mismatch, the MPDU may be considered damaged. At block 815, the processing logic may decrypt the MPDU at the receiver link lower-MAC.

At block 820, the processing logic may perform a replay check at the receiver link lower-MAC. At block 825, the processing logic may send the MPDU to a receiver multi-link upper MAC entity, such as the multi-link upper MAC entity 115.

At block 830, the processing logic may determine whether to use a partial-state BlockACK or a full-state BlockACK. Responsive to a determination to use a partial-state BlockACK ("YES" at block 830), at block 835, the processing logic may respond to a transmitter lower-MAC entity with a partial-state BlockACK. At block 840, the processing logic may run a Rx reorder on multiple MPDUs to determine whether the MPDUs were received in a correct order. In at least one embodiment, the Rx reorder operation may be performed on a per-link par link basis, meaning a separate Rx reorder operation at each link in a system. If, during the Rx reorder operation, MPDUs are found to be out of order, the processing logic may reorder the MPDUs to be in the correct order.

At block 845, the processing logic may decapsulate the MPDU and/or disaggregate A-MSDUs to yield a packet (which may include the packet received at block 705 of FIG. 7). At block 850, the processing logic may send the packet, such as to another device or to a network stack.

Responsive to a determination to use a full-state BlockACK ("NO" at block 830), at block 855, the processing logic may run a Rx reorder. At block 860, the processing logic may respond to a transmitter link lower MAC entity with a partial-state BlockACK and proceed to block 845 and block 850.

Thus, method 800 may improve functionality, performance, and compatibility by providing benefits that address failures in conventional systems. Such benefits may be provided to receivers in multi-link systems to perform per-link replay checks at the lower MAC level, construct BlockACK responses and conduct Rx window reordering operations at the receiver upper MAC level.

Figure 9:
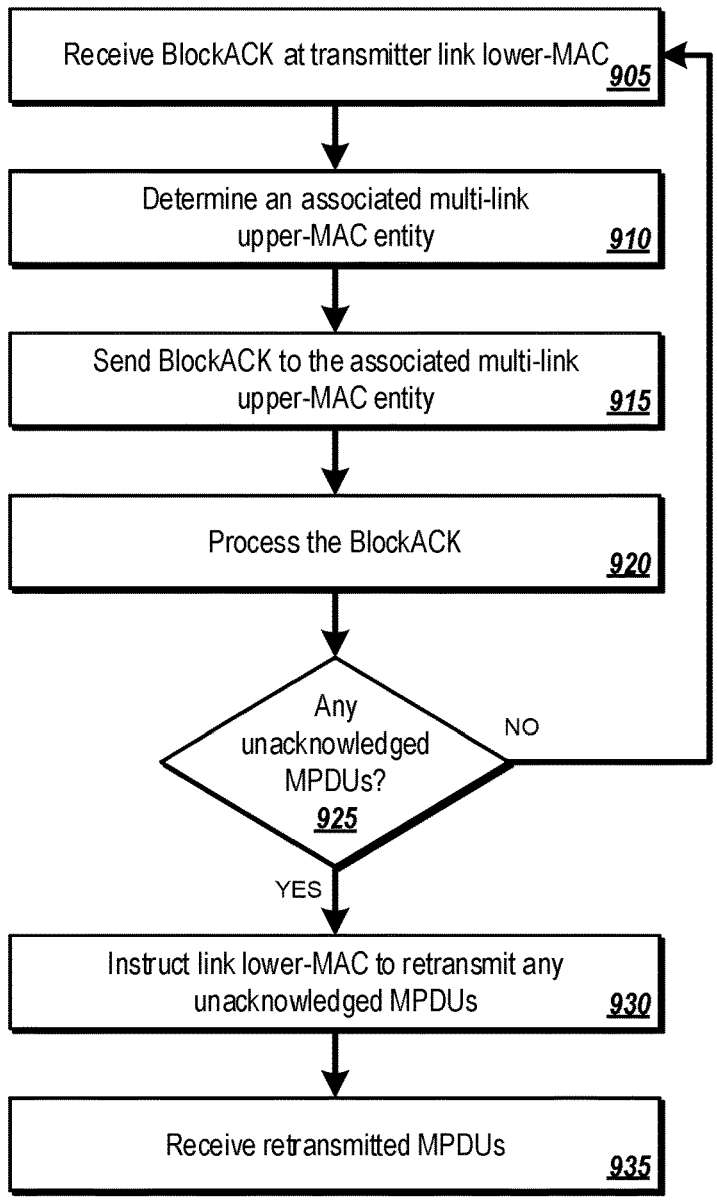
FIG. 9 illustrates a flow diagram of an example method of a transmitter processing a BlockACK response using multi-link frame format in a multi-link system.

FIG. 9 illustrates a flow diagram of an example method 900 of a transmitter processing a BlockACK response using multi-link frame format in a multi-link system. The method 900 may begin at block 905, where processing logic may receive a BlockACK at a transmitter link lower-MAC entity (e.g., transmitter link lower MAC entity 120) from a receiver link lower MAC entity (e.g., receiver link lower MAC entity 125). In a multi-link system, method 900 may be performed independently on each link in the multi-link system.

At block 910, the processing logic may determine an associated transmitter multi-link upper MAC entity. In at least one embodiment, the transmitter multi-link upper MAC entity may be determined based on a BlockACK frame multi-link MAC header, which may include a value to identify the transmitter multi-link upper MAC entity that is associated with the BlockACK. In an example, the MLE ID 1 illustrated in FIG. 5 may include the value to identify the transmitter multi-link upper MAC entity. At block 915, the processing logic may send the blockACK to the associated multi-link upper MAC entity identified at block 910.

At block 920, the processing logic may process the BlockACK at the transmitter multi-link upper MAC entity. Processing the BlockACK may include retiring all acknowledged MPDUs and advancing a Tx BlockACK window.

At block 925, the processing logic may determine whether there are any unacknowledged MPDUs. When there are no unacknowledged MPDUs ("NO" at block 925), the processing logic may proceed to block 905.

When there is at least one unacknowledged MPDUs ("YES" at block 925), at block 930 the processing logic may instruct the link lower-MAC to retransmit any unacknowledged MPDUs. In at least one embodiment, the processing logic may inform the transmitter link lower-MAC of the unacknowledged MPDUs and the transmitter link lower-MAC may request the unacknowledged MPDUs from the receiver link lower MAC. The receiver link lower-MAC may send the unacknowledged MPDUs to the transmitter link lower MAC and at block 935, the processing logic may receive, at the multi-link upper MAC entity, the unacknowledged MPDUs.

Figure 10:
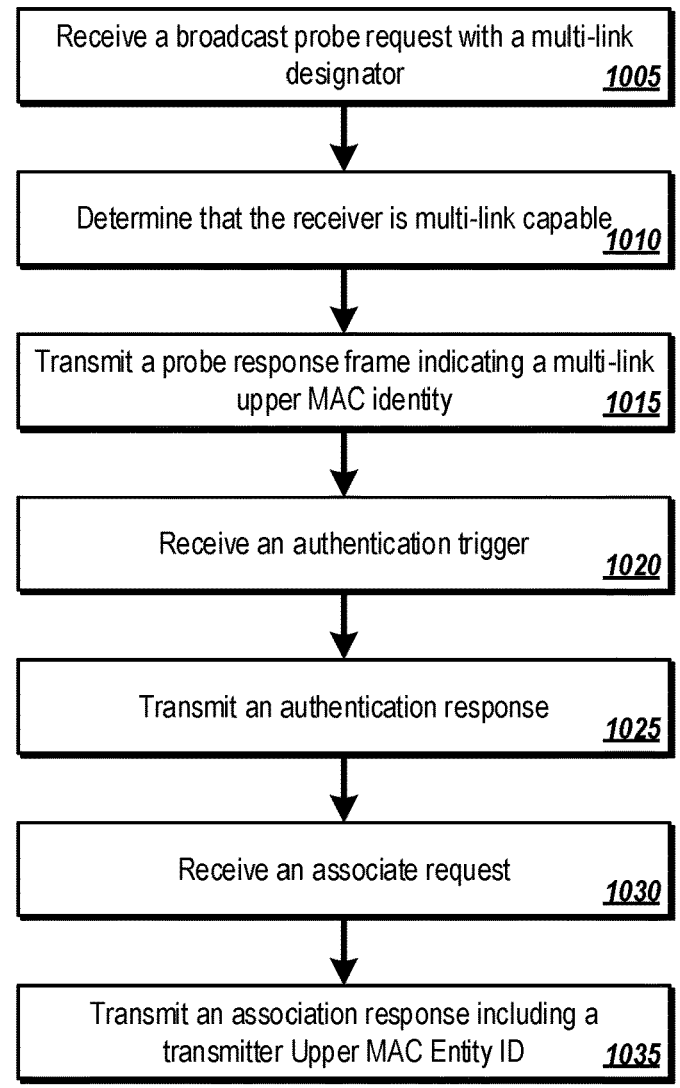
FIG. 10 illustrates a flow diagram of an example method to establish a multi-link Upper MAC entity relationship at a transmitter for multi-link communication between the transmitter and a receiver.

FIG. 10 illustrates a flow diagram of an example method 1000 to establish a multi-link upper MAC entity relationship at a transmitter for multi-link communication between the transmitter and a receiver. The method 1000 may begin at block 1005, where processing logic may receive, from the receiver, a broadcast probe request with a multi-link designator (e.g., a SSID, a wildcard, etc.). At block 1010, the processing logic may determine that the receiver is multi-link capable based on the probe request.

At block 1015, the processing logic may transmit a probe response frame indicating a multi-link upper MAC entity identity of the transmitter. At block 1020, the processing logic may receive an authentication trigger from the receiver. In at least one embodiment, the authentication trigger may include an open mode authentication trigger.

At block 1025, the processing logic may transmit an authentication response. In at least one embodiment, the authentication response may include an open mode authentication response. At block 1030, the processing logic may receive an associate request from the receiver. In at least one embodiment, the associate request may include a multi-link upper MAC entity identifier of the receiver. At block 1035, the processing logic may transmit an association response including a transmitter multi-link upper MAC entity ID.

Figure 11:
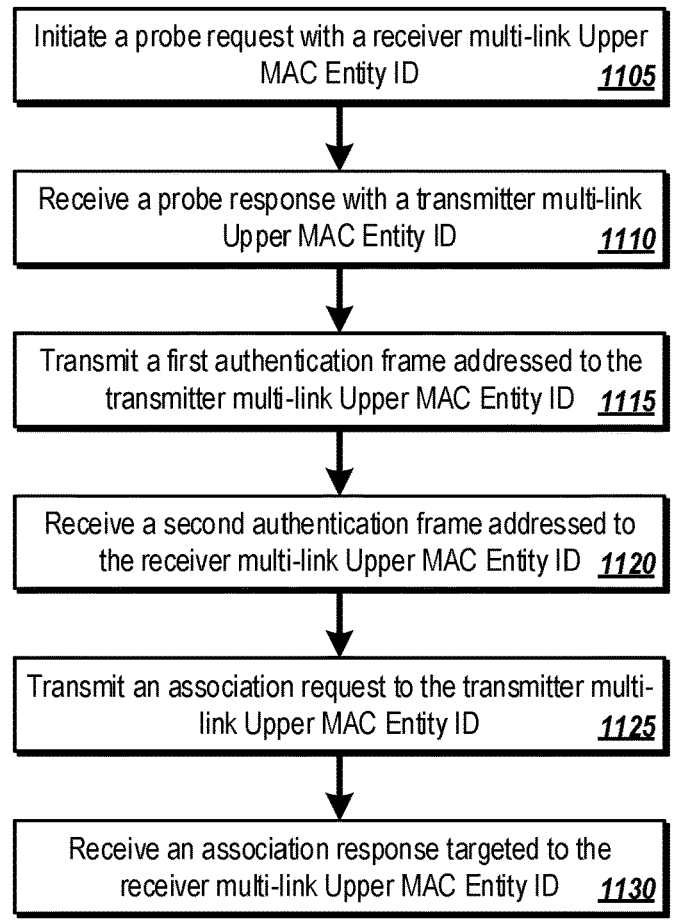
FIG. 11 illustrates a flow diagram of an example method to establish a multi-link Upper MAC entity relationship at a receiver for multi-link communication between a transmitter and the receiver.

FIG. 11 illustrates a flow diagram of an example method 1100 to establish a multi-link upper MAC entity relationship at a receiver for multi-link communication between a transmitter and the receiver. The method 1100 may begin at block 1105, where processing logic may initiate a probe request informing the transmitter that the receiver has multi-link support and a receiver multi-link upper MAC entity ID. At block 1110, the processing logic may receive a probe response from the transmitter with a transmitter multi-link upper MAC entity ID.

At block 1115, the processing logic may transmit a first authentication frame that is addressed to the transmitter multi-link upper MAC entity ID. At block 1120, the processing logic may receive a second authentication frame that is addressed to the receiver multi-link upper MAC entity ID. At block 1125, the processing logic may transmit an association request to the transmitter multi-link upper MAC entity ID. At block 1130, the processing logic may receive an association response targeted to the receiver multi-link upper MAC entity ID.

Example transmit path/chain includes the following discrete and shared components. A WIFI medium access control (WMAC) component includes: hardware queues for each downlink and uplink communication stream; encryption and decryption circuits for encrypting and decrypting the downlink and uplink communication streams; medium access circuit for making the clear channel assessment (CCA), and making exponential random backoff and re-transmission decisions; and a packet processor circuit for packet processing of the transmitted and received communication streams. The WMAC component has access to a node table which lists each node/station on the WLAN, the station's capabilities, the corresponding encryption key, and the priority associated with its communication traffic.

Each sounding or data packet for wireless transmission on the transmit path components to one or more stations is framed in the framer. Next each stream is encoded and scrambled in the encoder and scrambler followed by demultiplexing in demultiplexer into separate streams. Next streams are subject to interleaving and mapping in a corresponding one of the interleaver mappers. Next all transmissions are spatially mapped with a spatial mapping matrix (SMM) in the spatial mapper. The spatially mapped streams from the spatial mapper are input to Inverse Discrete Fourier Transform (IDFT) components for conversion from the frequency to the time domain and subsequent transmission in the AFT and RF stage.

A IDFT is coupled to a corresponding one of the transmit path/chain components in the AFT RF stage for wireless transmission on an associated one of MIMO antenna. Specifically each IDFT couples to an associated one of the digital-to-analog converters (DAC) for converting the digital transmission to analog, filters, upconverters, coupled to a common voltage controlled oscillator (VCO) for upconverting the transmission to the appropriate center frequency of the selected channel(s), and power amplifiers for setting the transmit power level of the transmission on the MIMO antenna array.

The receive path/chain includes the following discrete and shared components. Received communications on the WAP's array of MIMO antenna are subject to RF processing including downconversion in the AFE-RF stage. There are six receive paths each including the following discrete and shared components: low noise amplifiers (LNA) for amplifying the received signal under control of an analog gain control (AGC) (not shown) for setting the amount by which the received signal is amplified, downconverters coupled to the VCO for downconverting the received signals, filters for bandpass filtering the received signals, analog-to-digital converters (ADC) for digitizing the downconverted signals. In an embodiment, an optional sampler at the output of the ADCs allows sampling of the received WIFI signals in the time domain, for subsequent WIFI spatial diagnostics by the processor and non-volatile memory. The digital output from each ADC is passed to a corresponding one of the discrete Fourier transform (DFT) components in the baseband portion of the WIFI stage for conversion from the time to the frequency domain.

Receive processing in the baseband stage includes the following shared and discrete components including: an equalizer to mitigate channel impairments which is coupled to the output of the DFTs. In an embodiment, the received WIFI signals in the frequency domain from the output of the DFTs either with or without equalization are provided to the processor and non-volatile memory. The received WIFI streams at the output of the equalizer are subject to demapping and deinterleaving in a corresponding number of the demappers and deinterleavers. Next the received stream(s) are multiplexed in multiplexer and decoded and descrambled in the decoder and descrambler component, followed by de-framing in the deframer. The received communication is then passed to the WMAC component where it is decrypted with the decryption circuit and placed in the appropriate upstream hardware queue for upload to the Internet.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

The components and processes disclosed herein may be implemented singly or in combination by: hardware, circuits, firmware, software, or a processor executing computer program code; coupled to the wireless transceiver's transmit and receive path components, without departing from the scope of the Claimed Disclosure.

The subject technology is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1 includes a method that may include establishing a multi-link security association between a transmitter upper media access control (MAC) logic entity of a transmitter and a receiver upper MAC logic entity of a receiver. The transmitter may include a first transmitter link and a second transmitter link. The receiver may include a first receiver link and a second receiver link.

Example 2 includes a method that may include establishing a multi-link security association between a transmitter upper media access control (MAC) logic entity and a receiver upper MAC logic entity. The transmitter may include a first transmitter link and a second transmitter link. The receiver may include a first receiver link and a second receiver link. The method may include receiving, at the first receiver link, first data from the first transmitter link. The method may include receiving, at the second receiver link, second data from the second transmitter link.

Figure 12:
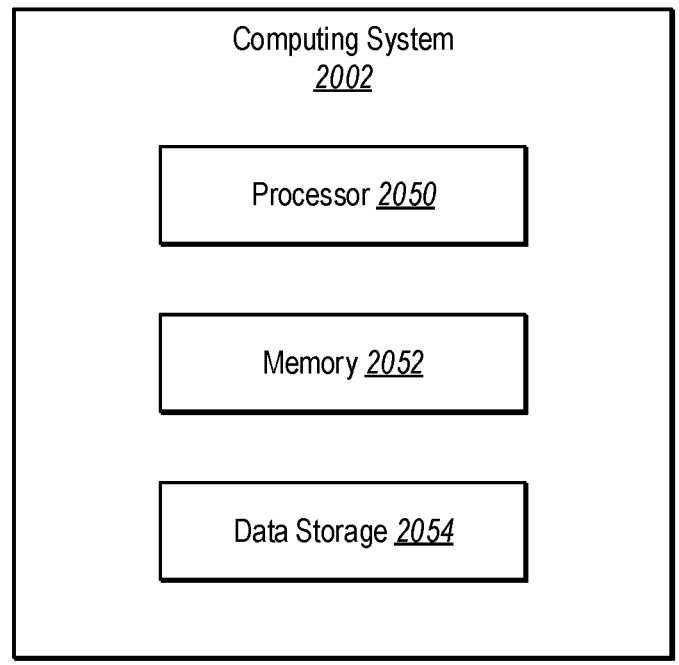
FIG. 12 illustrates an example system diagram in accordance with an example implementation.

FIG. 12 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, micro-processors (e.g., to perform or control performance of one or more operations), DSP's, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a very large-scale integration (VLSI) processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WIFI stage includes a baseband stage, and the analog front end (AFE) and Radio Frequency (RF) stages. In the baseband portion wireless communications transmitted to or received from each user/ client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Further, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, from a receiver, a broadcast probe request with a multi-link designator that identifies the probe request as a multilink probe request;
determining that the receiver is multi-link capable based on the multi-link designator;
transmitting a probe response including a first multi-link upper Media Access Control (MAC) entity identity of a transmitter, the transmitter having a MAC layer that is divided into an upper MAC and a lower MAC, the upper MAC being affiliated with the first multi-link upper Media Access Control (MAC) entity;
receiving an authentication trigger from the receiver; and
transmitting an authentication response to the receiver, wherein after a successful authentication, the transmitter and the receiver to establish a security association, wherein the security association is established by associating a transmitter link with a receiver link at a lower MAC level using a first Pairwise Transient Key Security Association (PTKSA), the transmitter link and the receiver link forming a link pair, the first PTKSA being specific to the link pair.

2. The method of claim 1, further comprising:
receiving an associate request from the receiver; and
transmitting an association response to the receiver.

3. The method of claim 2, wherein the association request includes a second multi-link upper MAC entity identifier of the receiver, and the association response includes the first multi-link upper MAC entity identity of the transmitter.

4. The method of claim 2, further comprising establishing a communication link between a first upper MAC logic entity identified by the first multi-link upper MAC entity identity of the transmitter and a second upper MAC logic entity identified by the second multi-link upper MAC entity identity of the receiver.

5. The method of claim 4, wherein the communication link includes at least one of a 2.4 GHz link, a 5 GHz link, or a 6 GHz link.

6. The method of claim 1, wherein the multi-link designator includes a Service Set Identifier (SSID) or a wildcard.

7. The method of claim 1, wherein the authentication response includes an open mode authentication response.

8. The method of claim 1, that transmitter being associated with one or more multi-link upper MAC entities to coordinate communication over one or more radios using one or more link lower MAC entities.

9. A method comprising:
initiating a probe request from a receiver to a transmitter with a multi-link designator that identifies the probe request as a multilink probe request;
receiving a probe response from the transmitter, the probe response including a first multi-link upper Media Access Control (MAC) entity identity of the transmitter, the transmitter having a MAC layer that is divided into an upper MAC and a lower MAC;
transmitting a first authentication frame addressed to a first upper MAC logical entity identified by the first multi-link upper MAC entity identity of the transmitter; and
receiving a second authentication frame addressed to a second upper MAC logical entity of the receiver, wherein after a successful authentication, the transmitter and the receiver to establish a security association, wherein the security association is established by associating a transmitter link with a receiver link at a lower MAC level using a first Pairwise Transient Key Security Association (PTKSA), the transmitter link and the receiver link forming a link pair, the first PTKSA being specific to the link pair.

10. The method of claim 9, further comprising:
transmitting an associate request to the transmitter; and
receiving an association response from the transmitter.

11. The method of claim 10, wherein the association request includes a second multi-link upper MAC entity identifier of the receiver, and the association response includes the first multi-link upper MAC entity identity of the transmitter.

12. The method of claim 10, further comprising establishing a communication link between a first upper MAC logic entity identified by the first upper MAC entity identity of the transmitter and a second upper MAC logic entity identified by the second upper MAC entity identity of the receiver.

13. The method of claim 12, wherein the communication link includes at least one of a 2.4 GHz link, a 5 GHz link, or a 6 GHz link.

14. The method of claim 9, wherein the multi-link designator includes a Service Set Identifier (SSID) or a wildcard.

15. The method of claim 9, wherein the second authentication frame includes an open mode authentication response.

16. One or more non-transitory computer-readable media storing instructions which, when executed by one or more processors, causes a system to perform operations, the operations comprising:
receiving, from a receiver, a broadcast probe request with a multi-link designator that identifies the probe request as a multilink probe request;
determining that the receiver is multi-link capable based on the probe request;
transmitting a probe response including a first multi-link upper Media Access Control (MAC) entity identity of a transmitter, the transmitter having a MAC layer that is divided into an upper MAC and a lower MAC;
receiving an authentication trigger from the receiver; and
transmitting an authentication response to the receiver, wherein after a successful authentication, the transmitter and the receiver to establish a security association, wherein the security association is established by associating a transmitter link with a receiver link at a lower MAC level using a first Pairwise Transient Key Security Association (PTKSA), the transmitter link and the receiver link forming a link pair, the first PTKSA being specific to the link pair.

17. The non-transitory computer-readable media of claim 16, wherein the operations further comprise:
receiving an associate request from the receiver; and
transmitting an association response to the receiver.

18. The non-transitory computer-readable media of claim 17, wherein the association request includes a second multi-link upper MAC entity identifier of the receiver, and the association response includes the first multi-link upper MAC entity identity of the transmitter.

19. The non-transitory computer-readable media of claim 17, wherein the operations further comprise establishing a communication link between a first upper MAC logic entity identified by the first multi-link upper MAC entity identity of the transmitter and a second upper MAC logic entity identified by the second multi-link upper MAC entity identity of the receiver.

20. The non-transitory computer-readable media of claim 16, wherein the multi-link designator includes a Service Set Identifier (SSID) or a wildcard.

21. The non-transitory computer-readable media of claim 16, wherein the authentication response includes an open mode authentication response.

* * * * *